United States Patent [19]

Hamel

[11] Patent Number: 5,277,446
[45] Date of Patent: Jan. 11, 1994

[54] TRAILER HITCH COUPLING DEVICE

[76] Inventor: Russell E. Hamel, 41301 Polly Butte Rd., Hemet, Calif. 92544

[21] Appl. No.: 45,607

[22] Filed: Apr. 9, 1993

[51] Int. Cl.$^5$ .............................................. B60D 1/36
[52] U.S. Cl. ............................... 280/477; 280/479.3; 280/491.2
[58] Field of Search ................... 280/477, 478.1, 479.2, 280/479.3, 491.2, 511

[56] References Cited

U.S. PATENT DOCUMENTS

| | | | |
|---|---|---|---|
| 2,451,660 | 10/1948 | Clark et al. | 280/33.15 |
| 2,488,805 | 11/1949 | Clark et al. | 280/33.15 |
| 3,596,925 | 8/1971 | Richie | 280/477 |
| 4,057,266 | 11/1977 | Duncan et al. | 280/475 |
| 4,254,969 | 3/1981 | Martin | 280/477 X |
| 4,773,667 | 9/1988 | Elkins | 280/478 B |
| 4,807,899 | 2/1989 | Belcher | 280/477 |
| 5,009,445 | 4/1991 | Williams | 280/477 |
| 5,048,854 | 9/1991 | Clark | 280/477 |
| 5,085,408 | 2/1992 | Norton et al. | 254/325 |
| 5,114,170 | 5/1992 | Lanni et al. | 280/477 |
| 5,213,354 | 5/1993 | Vaughn | 280/479.2 |

FOREIGN PATENT DOCUMENTS

| | | | |
|---|---|---|---|
| 3222306 | 12/1983 | Fed. Rep. of Germany | 280/477 |
| 9010550 | 9/1990 | PCT Int'l Appl. | B60D 1/38 |
| 1253811 | 11/1971 | United Kingdom | |
| 2210837 | 6/1989 | United Kingdom | B60D 1/14 |

Primary Examiner—Margaret A. Focarino
Assistant Examiner—Carla Mattix
Attorney, Agent, or Firm—Calif Tervo

[57] ABSTRACT

A device for coupling the hitch socket of a trailer to the hitch ball of a tow vehicle is attached to a tongue jack having a centered post. A rigid elongate bar comprising a pair of laterally spaced apart beams is mounted around the tongue post below the frame for longitudinal movement, lateral angular movement and vertical angular movement of the bar relative to the tongue. A ring on the bar fore end attaches to the ball such that the ball and socket may be hitched with the ring attached. A cable from a winch attached to the tongue pulls the bar centrally rearward whereby the hitch components are pulled into registry. In an alternate embodiment, a bracket mounting the bar centrally under the tongue includes a roller for bearing against the bar upper surface and supporting the tongue during retraction of the bar. The bar upper surface includes a vertical drop such that, upon registry, the roller descends the vertical drop and lowers the socket onto the ball. In still another embodiment, the bar includes a rearward section that drops relative to a forward section to drop the tongue to the hitch position upon registry.

12 Claims, 2 Drawing Sheets

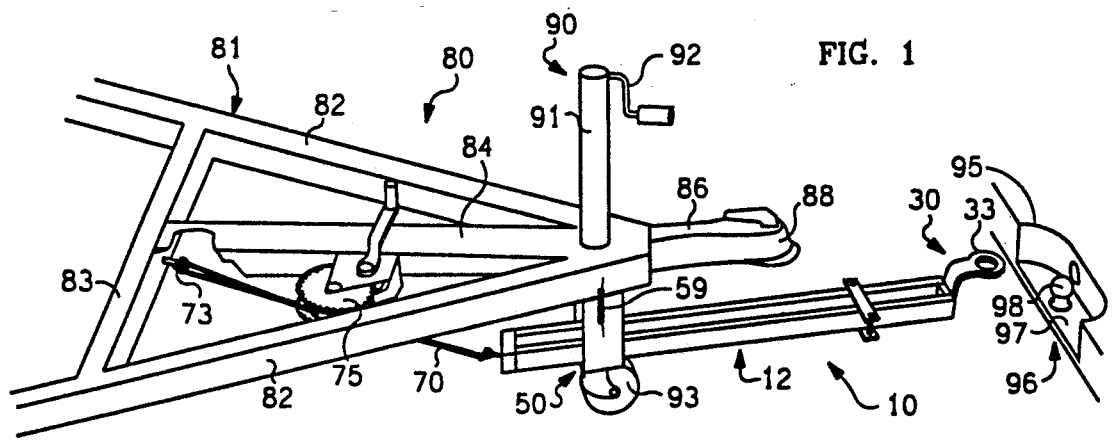
FIG. 1
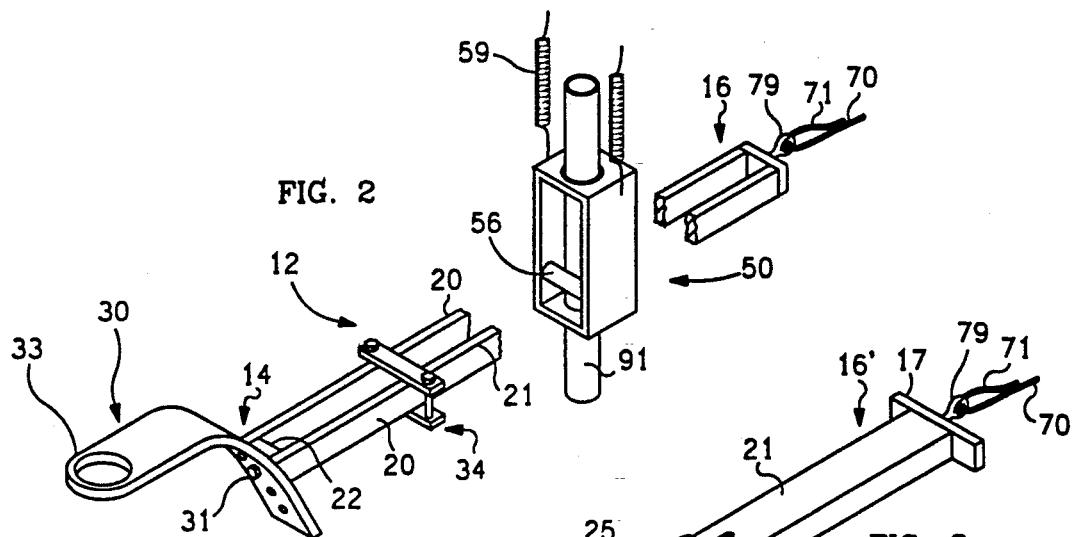
FIG. 2
FIG. 3
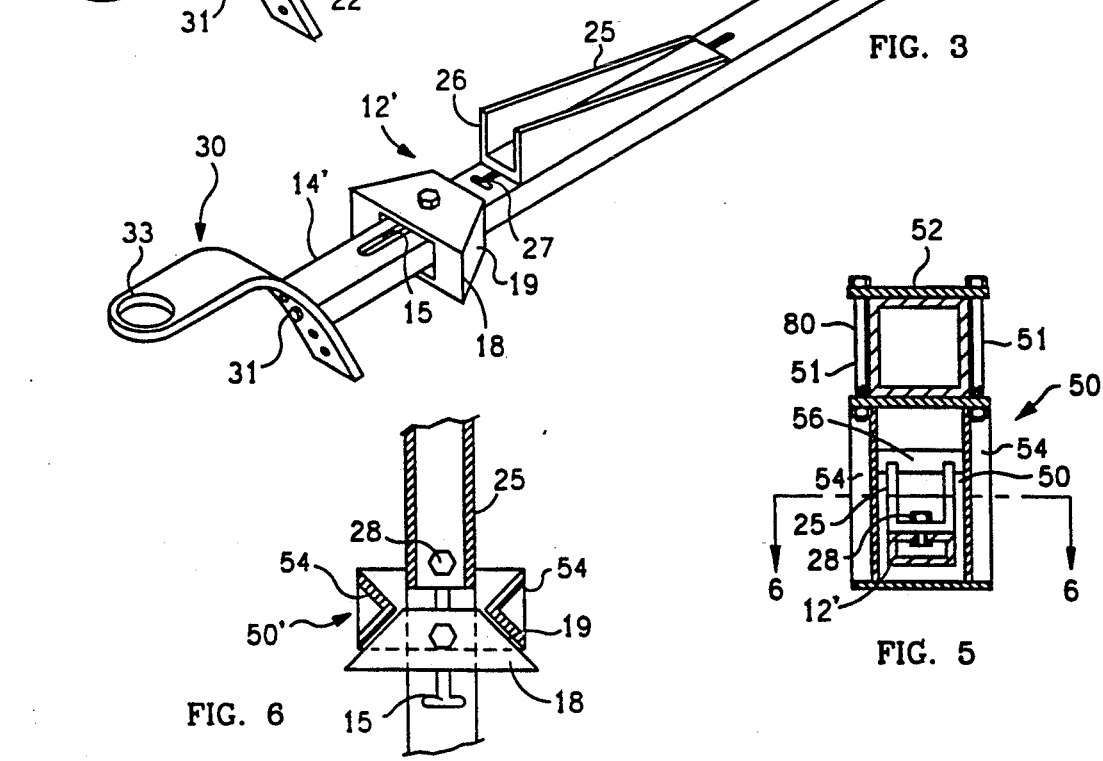
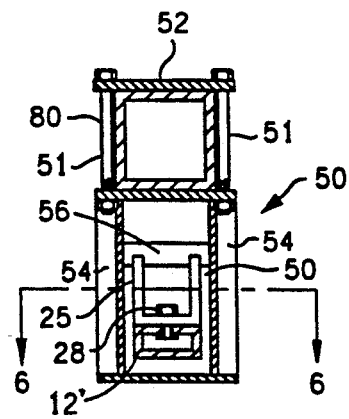
FIG. 5
FIG. 6

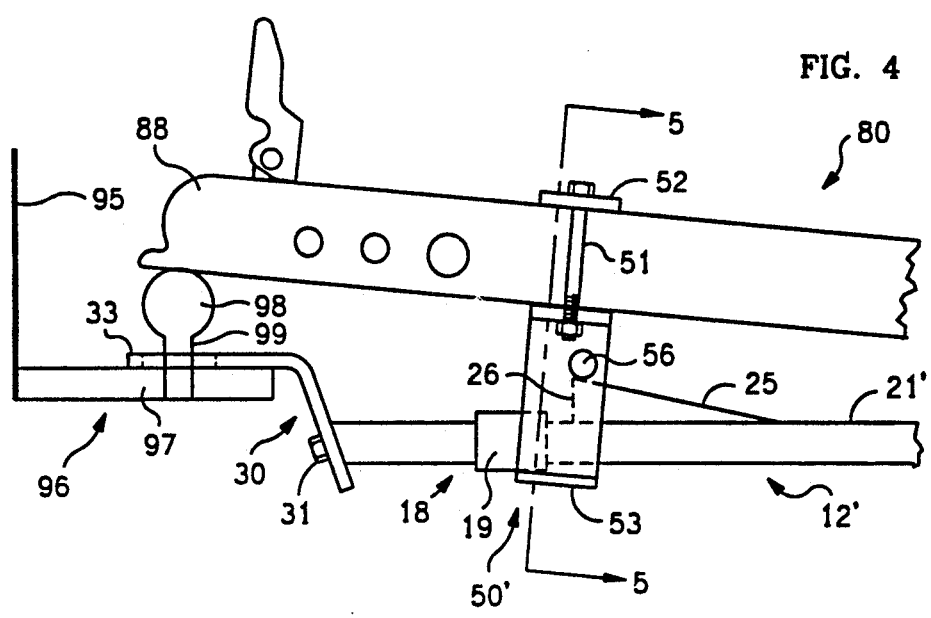
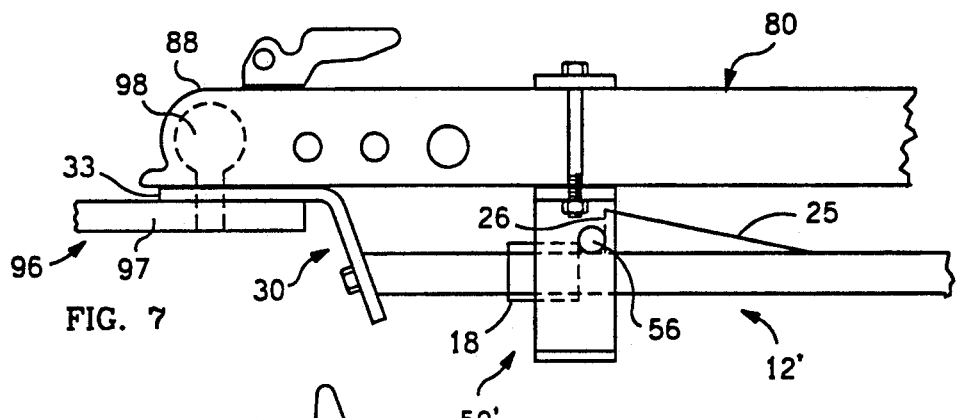
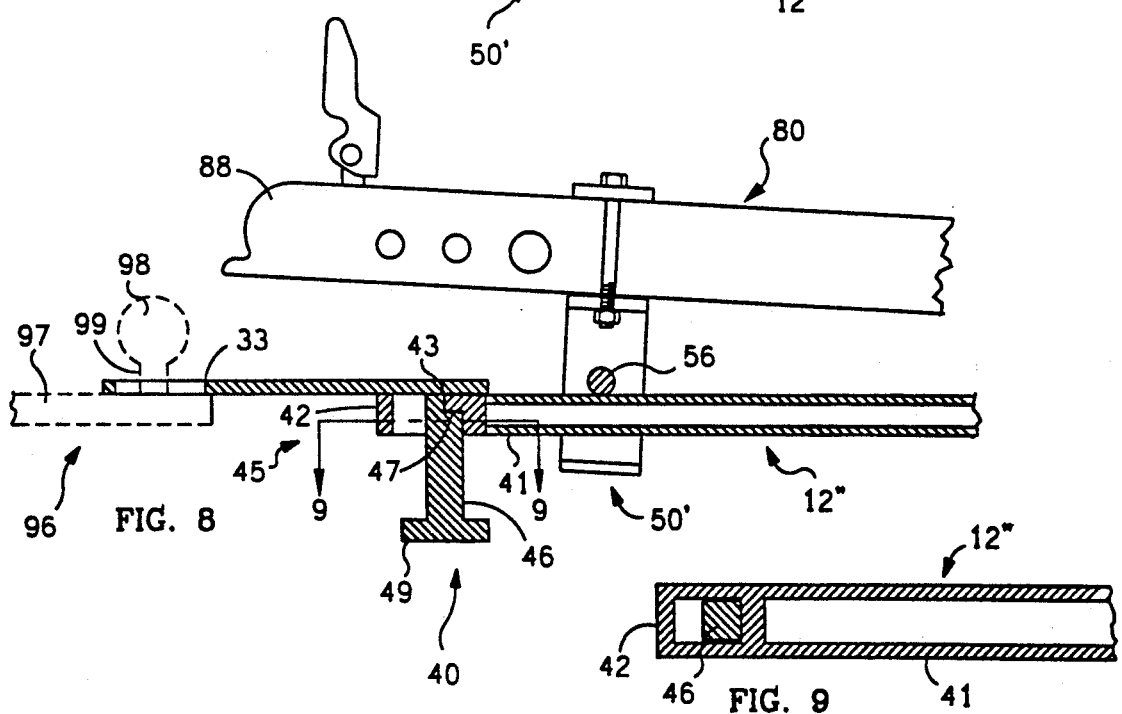

TRAILER HITCH COUPLING DEVICE

BACKGROUND OF THE INVENTION

Field of the Invention

This invention relates in general to a winching device that pulls the hitch socket on the tongue of a trailer into registry with the hitch ball on a towing vehicle and also lowers the socket into the hitch position on the ball.

Background Art

The general problems associated with attaching a trailer to a tow vehicle have long been recognized: the tow vehicle cannot be driven rearward so that the hitch ball is in perfect registry with the socket on the trailer tongue.

Prior art devices that move the trailer into registry for hitching have shortcomings. Some rigid devices require that the ball and socket be in extremely close proximity, usually less than a foot. Such proximity is difficult to achieve. Devices that fasten a cable to the tow vehicle and winch the hitch into alignment, typically are not capable of achieving full alignment. Also, once the trailer is unblocked for movement, should the cable break or become disengaged, the trailer may roll away. If the trailer is situated on a downhill, the cable will not stop the trailer from running into the tow vehicle should the trailer start to roll. Additionally, the cable draw devices do not provide for complete coupling, that is for lowering the socket onto the ball. With the prior art devices, final coupling must be done manually or by first raising the tongue and then, upon registry, lowering the tongue with a jack.

Therefore, it is desirable to have a hitch coupling device that is operable over a considerable distance.

It is further desirable that, once attached, the coupling device prevents an unblocked trailer from running away or from running into the tow vehicle.

It is further desirable that the coupling device bring the ball and socket into perfect vertical registry.

It is further desirable that the coupling device drop the socket on the ball in hitch position.

It is further desirable that such a coupling device be easily attached to existing trailers and not require elaborate or expensive modifications.

SUMMARY OF THE INVENTION

This invention is a coupling device for coupling the hitch component, typically a socket, of a trailer to the hitch component, typically a ball, of a tow vehicle. Several embodiment of the invention are shown and described.

A first embodiment is attached to a tongue jack having a centered post. A rigid elongate bar comprising a pair of laterally spaced apart beams is mounted around the tongue post below the frame such that one of the beams passes on one side of the post and the other beam passes on the other side of the post for longitudinal movement, lateral angular movement and vertical angular movement of the bar relative to the tongue. A front spacer connects the beams at their fore end and a rear spacer connects the beams at their rear end in laterally spaced apart relationship. A ring on the bar fore end attaches to the hitch ball such that the ball and socket may be hitched with the ring attached.

A rope or cable is attached to the rear end of the bar. A winch attached to the tongue retracts the rope and pulls the bar centrally rearward. A centrally located pulley may be required for this. In this manner the hitch components are pulled into registry.

An alternate embodiment is particularly suited for use when a central jack is not present. A bracket mounts the bar to the tongue centrally under the tongue for longitudinal movement, lateral angular movement and vertical angular movement of the bar relative to the tongue. The bracket includes a passageway through which the bar passes. An adjustably positionable flange attached to the bar interacts with the bracket and prevents further retraction of the bar when the hitch components are in registry. A bar rear end flange prevents the bar from being pulled completely forward of the bracket. The bracket includes a roller for bearing against the bar and supporting the tongue during retraction of the bar. A horizontal wedge is attached to the bar for interaction with the bracket for guiding the bar such that the hitch components are pulled into registry.

In a preferred embodiment, the bar includes an upper surface including a vertical drop. The bracket roller bears against the bar upper surface and supports the tongue during retraction of the bar and, upon registry, descends the vertical drop and lowers the socket onto the ball.

In still another embodiment, the bar includes a forward section and a rearward section. The forward section includes a rear end including a downward protruding vertical member having a shoulder on its rear side. The fore end of the rearward section includes a collar passing around the vertical member including a shelf for sitting on the shoulder for supporting the tongue during retraction of the bar and for sliding off the self and dropping the tongue to the hitch position upon registry.

Other features and many attendant advantages of the invention will become more apparent upon a reading of the following detailed description together with the drawings in which like reference numerals refer to like parts throughout.

BRIEF DESCRIPTION OF THE DRAWINGS

FIG. 1 is a perspective view of a trailer tongue, a tow vehicle hitch assembly and a first embodiment of the trailer hitch coupling device of the invention.

FIG. 2 is an enlarged perspective view, partially cut away, of the bar and mounting bracket of the coupling device of FIG. 1

FIG. 3 is a perspective view of an alternate embodiment of a coupling bar.

FIG. 4 is a partial side elevation view of the coupling bar of FIG. 3 as mounted on a trailer tongue and attached to a tow vehicle hitch assembly. The tongue hitch socket is almost in vertical registry with the ball hitch.

FIG. 5 is a sectional view taken on line 5—5 of FIG. 4 showing the bracket mounted on the tongue and showing the relationship of the bar in the bracket.

FIG. 6 is a sectional view taken on line 6—6 of FIG. 5 showing the bar and registry stop.

FIG. 7 is a partial side elevation view, similar to FIG. 4 with the tongue dropped so as to be hitched to the tow vehicle.

FIG. 8 is partial cross-sectional side elevation view of an alternate configuration of the bar including a drop connection for dropping the tongue to the hitch position upon registry.

FIG. 9 is a sectional view taken on line 9—9 of FIG. 8 showing the collar and vertical member of the drop connection.

DETAILED DESCRIPTION OF THE INVENTION

With reference now to the drawing, and more particularly to FIG. 1 thereof, there is shown a perspective view of a trailer tongue, denoted generally as 80, and a first embodiment of the trailer hitch coupling device of the invention, denoted generally as 10. Also shown, is a tow vehicle 95 having a hitch assembly, denoted generally as 96, mounted thereon including a hitch component, such as hitch ball 98 mounted on hitch plate 97.

Tongue 80 is of convention type such as may be found on many trailers, although a typical boat trailer configuration is shown. Tongue 80 includes a frame, denoted generally as 81, formed of an outer pair of hollow channel or box beams 82 that converge forwardly and merge with a forwardly extending center portion 86. A tongue hitch component, such as socket 88, is attached to center portion 86. Cross beam 83 traverses laterally between outer beams 82. Center beam 84 spans directly rearward of socket 88 and connects cross beam 83 with center portion 86. The rearward ends of side beams 82 may proceed rearward as a trailer frame or may be hingedly connected to the trailer. With regard to tongue 80, the term "center" or "centrally" is defined as indicating directly rearward from socket 88.

Jack 90 is attached to frame 81. Jack 90 is a typical tongue jack and includes a vertical post 91, crank 92 and a ground platform or swivel wheel 93. As shown, jack post 91 passes centrally through tongue 80 and a portion of post 91 lies below frame 81. Jack 90 can be used for raising and lowering tongue outer end and consequently socket 88.

The coupling device 10 generally comprises a rigid elongate bar, denoted generally as 12, a mounting bracket, denoted generally as 50, a flexible tension member, such as rope 70, and a winch, denoted generally as 75.

FIG. 2 is an enlarged perspective view, partially cut away, of bar 12 and mounting bracket 50 of the coupling device 10 of FIG. 1.

As best seen in FIG. 2, bar 12 has a fore end 14 and a rear end 16. Bar 12 generally comprises a pair of laterally spaced apart beams 20, a front spacer 22 connecting beams 20 at their fore end 14 in laterally spaced apart relationship, a rear spacer 24 connecting beams 20 at their rear end 16 in laterally spaced apart relationship, and attachment means, such as attachment member denoted generally as 30, on fore end 14 of bar 12 for attachment to a tow vehicle hitch assembly. Depending somewhat on trailer size, bar 12 is typically four feet to 8 feet in length. The length is only limited by the total length of the trailer and tongue such that bar 12 can be retracted centrally rearwardly as later described.

Beams 20 are strong rigid members typically made of steel and include a top side. Beams 20 are attached to spacers 22, 24 such that a beam passes freely on each side of jack post 91. Spacers 22, 24 hold beams in laterally spaced relationship such that jack post 91 can pass between beams 20. In this manner, bar 12 may move longitudinally, angularly laterally, and angularly vertically relative to tongue 80.

Attachment member 30 includes a rear end attached to attached to bar front spacer 22 by bolt 31 and a front end including a ring 33 for filling over a hitch ball. Means, such as a series of vertical bolt holes 32, is provided for adjusting the height of ring 33 relative to top 21 of beams 20. Ring 33 is configured for passing over hitch ball 98.

Although split beam 12 is shown mounted on jack post 91, split beam 12 can be mounted around any centrally located post protruding downward from tongue 80, and provision for such a post is contemplated in the invention.

A retaining means, such as bracket 50, retains bar 12 on post 91. In its simplest sense, the retaining means is any enlargement on post 91 below bar 12 that prevents bar 12 from falling off the bottom of post 91. This could be the a jack part, such as swivel wheel 93, or a cotter key or flange washer attached to the post 91.

In the preferred embodiment shown, bracket 50 is attached to tongue 80 centrally below the frame. Preferably, bracket 50 is mounted on post 91 and attached to frame 81 by any suitable means, such as straps or coil springs 59. Bracket 50 includes a roller 56 for bearing against the top of bar 12 and supporting tongue 80 during retraction of bar 12 to the registry position.

A registry stop means, such as movable flange 34, is attached to bar 12 for contact with post 91 or bracket 50 for preventing further retraction of bar 12 when the hitch components 88, 98 are in registry. Flange 34 is a pair of bars passing above and below beams 20 and joined at each outer end by bolts.

A flexible tension member, such as rope 70, has a front end 71 attached to the rear end 16 of bar 12 by means such as to eye bolt 79.

Winch means, such as winch 75, is connected to tongue 80 and engages rope 70 for retracting bar 12 by pulling bar 12 centrally rearward when ring 33 is attached to ball 98 such that hitch components 88, 98 are pulled into vertical registry. If winch 75 is mounted forwardly, as shown, rope 70 passes through means, such as a pulley 73 centrally attached to frame 80, to direct the rope pull centrally rearward on bar 12 to result in the registering motion.

FIGS. 3-7 show an alternate embodiment of the invention.

FIG. 3 is a perspective view of an alternate embodiment of a coupling bar 12' that is similar in many respects to bar 12 except it is specifically configured to be mounted in a bracket 50' which will be described in greater detail hereinafter. Bar 12' is a rigid elongate bar, such as of steel, in the form of a hollow beam having a fore end 14', rear end 16' and top side 21'.

Rear end 16' includes an end stop means, such as end stop flange 17 for interaction with bracket 50' for preventing bar 12' from being pulled completely forward of bracket 50'.

Top side 21' includes vertical drop 26. In the embodiment shown, vertical drop 26 is accomplished by a fastening a right angled or nearly right angled wedge-shaped ramp 25 to the remainder of bar 12' with the acute angle to the rear. Ramp 25 is fastened to and is longitudinally adjustable along slot 27 by means known in the art.

Centering means, such as wedge 18, fastened to and longitudinally adjustable along slot 15, interacts with bracket 50' upon retraction of bar 12' for guiding bar 12' such that hitch components 88, 98 are pulled into vertical registry. Wedge 18 has its apex toward the rear and base toward the front. Wedge 18 may also serve as a registry stop means for interaction with bracket 50' for preventing further retraction of bar 12' when hitch components 88, 98 are in registry.

FIG. 4 is a partial side elevation view of the coupling bar 12' of FIG. 3 as mounted in bracket 50' on trailer tongue 80 with ring 33 attached to stem 99 of ball 98.

Turn momentarily to FIGS. 5 and 6 to view bracket 50'. FIG. 5 is a sectional view taken on line 5—5 of FIG. 4 showing bracket 50' centrally mounted to tongue 80 by any suitable means, such as clamped on by elongated bolts 51 from bar 52 crossing over the top of frame 80. Bottom wall 53, side walls 54, and roller 56 laterally traversing between side walls 54 define a passageway 58 for bar 12'. Bracket 50' supports bar 12' to tongue 80. Passageway 58 is of short length so that bar 12', when extended, has considerable freedom to move longitudinally, angularly laterally, and angularly vertically relative to tongue 80 such that it can attach to ball hitch 98 in the proximity. Roller 56, supporting tongue 80, is resting on ramp 25. A sliding T-bolt 28 passes through slot 27 to connect ramp 25 to remainder of bar 12'.

FIG. 6 is a sectional view taken on line 6—6 of FIG. 5 showing bar 12' and registry stop wedge 18. In the embodiment shown, passageway side walls 54 are inwardly slanted from the front and wedge outside side walls 19 are outwardly slanting from the rear and adapted angularly so as to mate with side walls 54 to move upon retraction bar 12' into registry position. Wedge 18 may also serve as a registry stop in that it restricts further retraction of bar 12'.

In use, with tongue 80 generally horizontal supported by a tongue jack, tow vehicle 95 is moved such that hitch ball 98 is in the proximity of hitch socket 88.

Returning once more to FIG. 4, the interaction of the elements will be more fully seen. Bar 12' is pulled forward by hand, and ring 33 is placed over ball 98. Ball 98 typically is mounted on the upper end of a stem 99 of much smaller diameter. Ring 33 is vertically thin such that socket 88 can be attached to ball 98 with ring attached around stem 99. The front end of bar 12' is supported by hitch plate 97, and the tongue jack, if any, may be manipulated so that the fore end of tongue 80 is supported by roller 56 on upper surface 21' of bar 12'. Bar 12' is retracted relative to tongue 80 by cranking winch 75. This moves tongue 80 forward, rolling on roller 56 on top 21 of bar 12'. Roller 56 rolls up ramp 25 to raise socket 88 to a position higher than ball 98. At this point, wedge 18 encounters bracket 50' to assure registration of ball 98 and socket 88. The position of ramp 25 is adjusted so that roller 56 encounters vertical drop 26 when socket 88 and ball 89 are in vertical registry. In FIG. 4, socket 88 is almost vertical registry with the ball 98.

FIG. 7 is a side elevation view, similar to FIG. 4 but with bar 12' further retracted such that roller 56 has fallen off ramp 25 down vertical drop 26 whereby tongue 80 has dropped and socket 88 has dropped into the hitching position on ball 98.

FIGS. 8 and 9 show alternate elements for dropping tongue 80 to the hitch position. FIG. 8 is partial cross-sectional side elevation view similar to FIG. 4 of an alternate configuration of bar 12" including a drop connection, denoted generally as 40, for dropping the tongue 80 to the hitch position upon registry. FIG. 9 is a sectional view taken on line 9—9 of FIG. 8 showing the collar 42 and vertical member 46 of bar drop connection 40.

Bar 12" includes a front section 45 and a rear section 41. The rear end of front section 45 includes a downward projecting vertical member 46 having a shoulder 47 on the upper end of its rear side. Rear section 41 includes on its front end a collar 42 passing around vertical member 46 including a shelf 43 for sitting on shoulder 47 for supporting tongue 80 during retraction of bar 12" and for sliding off shelf 43 and dropping tongue 80 to the hitch position upon registry. There is sufficient space between the forward portion of collar 42 and vertical member 46 so that shelf 43 can be pulled off shoulder 47. Upon retraction of bar 12", shelf 43 is retained on shoulder 47 by a combination of friction and a binding force due to tilting of collar 42 because of the tongue weight. Upon vertical registration of ball 98 and socket 88, a bracket member, such as roller 56, contracts the rear of bar front section 45 and is sufficiently stopped such that further retraction of bar 12" pulls shelf 43 off shoulder 47 such that rear section 41, and tongue 80 supported thereby, drops with it to the hitch position with socket 88 on ball 98. Means is provided for preventing collar 42 from entirely disengaging with vertical member 46. In the embodiment shown, the bottom end of vertical member 46 includes bottom flange 49 for this purpose.

It can be appreciated that the invention provides a very efficient and convenient manner of connecting a trailer tongue to a tow vehicle hitch and offer several advantages over the prior art. For example, the invention prevents damage to trailer or tow vehicle resulting from unwanted trailer movement. Once the bar is attached to the tow vehicle, the trailer cannot roll away backwards even if the rope should break. Also, the bar and stopping devices prevent the trailer from rolling forward so as to hit the tow vehicle and cause damage.

Although particular embodiments of the invention have been illustrated and described, various changes may be made in the form, composition, construction, and arrangement of the parts without sacrificing any of its advantages. For example, the split bar 12 of FIG. 2 may be equipped as is bar 12' of FIG. 3 with a ramp 25 and wedge 18. Therefore, it is to be understood that all matter herein is to be interpreted and illustrative and not in any limiting sense and it is intended to cover in the appended claims such modifications as come within the true spirit and scope of the invention.

I claim:

1. A coupling device for use with a tow vehicle carrying a hitch assembly including a hitch component for bringing into registry the tow vehicle hitch component and a mating hitch component mounted on the forward end of a tongue, the coupling device comprising:

a rigid elongate bar having a fore end and a rear end and including:

attachment means on said fore end of said bar for attachment to the tow vehicle hitch assembly such that the hitch components may be hitched with the attachment means attached;

a bracket mounting said bar to the tongue centrally under the tongue for longitudinal movement, lateral angular movement and vertical angular movement of said bar relative to the tongue;

a flexible tension member having a front end attached to the rear end of said bar; and winch means connected to the tongue and engaging said flexible tension member for retracting said bar by pulling said bar centrally rearward when said attachment means is attached to the tow vehicle hitch component such that said hitch components are pulled into registry.

2. The coupling device of claim 1 further including:
registry stop means attached to said bar for interaction with said bracket for preventing further retraction of said bar when the hitch components are in registry.

3. The coupling device of claim 1 further including:
end stop means attached to said bar for interaction with said bracket for preventing said bar from being pulled completely forward of said bracket.

4. The coupling device of claim 1 wherein:
said bracket includes:
   a roller for bearing against said bar and supporting the tongue during retraction of said bar to registry.

5. The coupling device of claim 1 further including:
centering means attached to said bar for interaction with said bracket upon bar retraction for guiding said bar such that said hitch components are pulled into registry.

6. The coupling device of claim 1 wherein:
said bar includes an upper surface including a vertical drop; and said bracket includes:
   a roller for bearing against said bar upper surface and supporting the tongue during retraction of said bar such that, upon registry, said roller descends said vertical drop and lowers the tongue hitch component to a hitch position.

7. The coupling device of claim 1 wherein:
said bar includes a forward section and a rearward section;
said forward section including a rear end including:
   a downward protruding vertical member having a shoulder on its rear side;
said rearward section including a fore end including:
   a collar passing around said vertical member including:
      a shelf for sitting on said shoulder for supporting the tongue during retraction of said bar up to the registry position; said bracket encountering said forward section at registry such that further retraction of said bar pulls said shelf off said shoulder thereby dropping the tongue to the hitch position.

8. A coupling device for use with a tow vehicle carrying a hitch assembly including a hitch component for bringing into registry the tow vehicle hitch component and a mating hitch component mounted on the forward end of a tongue frame, the tongue including a centered, downward protruding post, the coupling device comprising:
a rigid elongate bar having a fore end and a rear end and comprising:
   a pair of laterally spaced apart beams mounted around the tongue post such that one of said beams passes on one side of the post and the other of said beams passed on the other side of the post for longitudinal movement, lateral angular movement and vertical angular movement of said bar relative to the tongue;
   a front spacer connecting said beams at the fore end in laterally spaced apart relationship;
   a rear spacer connecting said beams at the rear end in laterally spaced apart relationship; and
   attachment means on said fore end of said bar for attachment to the tow vehicle hitch assembly such that the hitch components may be hitched with the attachment means so attached;
retaining means for retaining said bar on the post;
a flexible tension member having a front end attached to the rear end of said bar;
winch means connected to the tongue and engaging said flexible tension member for retracting said bar by pulling said bar centrally rearward when said attachment means is attached to the tow vehicle hitch component such that said hitch components are pulled into registry.

9. The coupling device of claim 8 further including:
registry stop means attached to said bar for interaction with the post for preventing further retraction of said bar when the hitch components are in registry.

10. The coupling device of claim 8 including:
a bracket mounted to the tongue under the frame including:
   a roller for bearing against said bar and supporting the tongue during retraction of said bar to registry.

11. The coupling device of claim 10 further including:
centering means attached to said bar for interaction with said bracket upon bar retraction for guiding said bar such that said hitch components are pulled into registry.

12. The coupling device of claim 10 wherein:
said bar includes an upper surface including a vertical drop such that, upon registry, said roller descends said vertical drop and lowers the tongue hitch component to a hitch position.

* * * * *